(12) United States Patent
Maesato et al.

(10) Patent No.: US 8,358,836 B2
(45) Date of Patent: Jan. 22, 2013

(54) SPECIFIC COLOR DETECTION APPLICATOR

(75) Inventors: Shinichi Maesato, Tokyo (JP); Takeshi Iseki, Tokyo (JP)

(73) Assignee: Ikegami Tsushinki Co. Ltd. (JP)

( * ) Notice: Subject to any disclaimer, the term of this patent is extended or adjusted under 35 U.S.C. 154(b) by 526 days.

(21) Appl. No.: 12/707,793

(22) Filed: Feb. 18, 2010

(65) Prior Publication Data

US 2010/0302400 A1    Dec. 2, 2010

(30) Foreign Application Priority Data

May 27, 2009   (JP) ................................. 2009-128216

(51) Int. Cl.
*G06K 9/00*    (2006.01)
(52) U.S. Cl. ........................................ 382/162; 382/118
(58) Field of Classification Search .................. 382/118, 382/162–167
See application file for complete search history.

(56) References Cited

U.S. PATENT DOCUMENTS

| | | | |
|---|---|---|---|
| 6,631,208 B1* | 10/2003 | Kinjo et al. | 382/167 |
| 2002/0051145 A1* | 5/2002 | Watanabe et al. | 358/1.9 |
| 2002/0102017 A1* | 8/2002 | Kim et al. | 382/164 |
| 2003/0068084 A1* | 4/2003 | Kinjo et al. | 382/164 |
| 2005/0105111 A1* | 5/2005 | Ott et al. | 358/1.9 |
| 2007/0242874 A1* | 10/2007 | Huang et al. | 382/162 |

FOREIGN PATENT DOCUMENTS

JP    6-105323 A    12/1999

* cited by examiner

*Primary Examiner* — Jingge Wu
(74) *Attorney, Agent, or Firm* — Factor Intellectual Property Law Group, Ltd.

(57) ABSTRACT

A specific color detection circuit shows an RGB input pixel and an RGB color signal to be detected in a three-dimensional coordinate, calculates a first distance from an origin to a foot of a perpendicular drawn from the coordinate of the RGB input pixel to a straight line connecting the origin and the coordinate of the RGB color signal or a coordinate with the same RGB ratio as the signal and a second distance from the coordinate of the input pixel to the foot, and detects a hue of a signal of the input pixel. The circuit generates a detection region in a color-difference direction according to the first distance and the hue, calculates a third distance based on the first distance for the detection region and judges the input pixel as being in a predetermined color detection region when the third distance is longer than the second distance.

8 Claims, 14 Drawing Sheets

(A)

(B)

(A)

(B)

(A)

(B)

(A)

(B)

(A)

(B)

(A)

(B)

(A)

(B)

SPECIFIC COLOR DETECTION APPLICATOR

CROSS REFERENCE TO RELATED APPLICATIONS

This application claims the filing benefit of Japanese Patent Application No. 2009-128216, filed May 27, 2009 the contents of which are incorporated herein by reference.

BACKGROUND OF THE INVENTION

1. Field of the Invention

The present invention relates to a color detection circuit used for detecting a desired color from a video signal to perform image processing.

2. Description of the Related Art

Skin-detail is a heretofore known technique wherein a desired color is detected from a video signal imaged with a television camera and image processing is performed. The skin-detail is performed by detecting a skin-color area from the video signal imaged and controlling an outline enhancement signal. According to the technique of the skin-detail, it is possible to show a face of a person more favorable.

This technique has become more important because of a recent development of high definition imaging of video apparatuses including the television camera. That is, since the number of pixels constituting a screen is increased for the high definition imaging and a video image has a higher resolution, it is required to prevent undesired portions from standing out.

In addition, there is a color corrector for detecting the desired color and performing the image processing. The color corrector performs color correction processing to a color and a color area to be detected. By performing the color correction processing using the color corrector, it is possible, for example, to make a color departing from a specified color system put in a range of the color system. Moreover, for usages of monitoring and examination of the video image, there have been a variety of applications of the color corrector such as one for facilitating determination and judgment of a certain object by changing the color to be detected into the desired color.

As a conventional skin-color detection circuit, a technique is suggested where an IQ signal is generated from an RGB video signal obtained from the television camera and a skin-color judgment is performed based on the IQ signal (see Japanese Patent No. 2986625, for example).

Incidentally, a color has a property of changing its density remarkably according to the brightness of an environment. For example, when imaging a face of a person, a color of the face of the person in the image, which should stay in the original color, differs dramatically according to a small change of a direction from which the light illuminates the face.

However, a skin-color detection circuit and an imaging device suggested in the above Japanese Patent No. 2986625 performs color detection based only on the IQ signal, that is, a color difference in a two-dimensional plane. Thus, the skin-color detection circuit and the imaging device cannot accurately control detection based on a luminance difference.

Since the television camera for broadcasting, in particular, is often used under special circumstances which are different from the usual surrounding environment, it is necessary to consider controlling in relation to a luminance direction. In addition, it is difficult to detect a desired color range by simply specifying a detection region because people's skin colors vary dramatically among individuals by race, for example. It is thus necessary to consider a method for controlling the detection region as well.

SUMMARY OF THE INVENTION

In consideration of problems stated above, an object of the present invention is to provide a specific color detection circuit which enables detection of a desired color in a desired color range by controlling detection of color according to a luminance difference and controlling detection region on a color difference plane.

The object may be achieved, according to the invention wherein a specific color detection circuit (KEY signal generation circuit 10) for judging whether an RGB input pixel is a signal in a predetermined color detection region having a color signal to be detected as a center thereof, comprising:

a first distance calculation unit (distance calculation unit A 102) for showing an RGB input pixel and an RGB color signal to be detected in a three-dimensional coordinate with three axes of R axis, G axis and B axis, and, in relation to a straight line connecting an origin and calculating a distance, as a first distance, from an origin to a foot of a perpendicular drawn from the coordinate of the RGB input pixel to a straight line connecting the origin and the coordinate of the RGB color signal to be detected or a coordinate with the same RGB ratio as that of the RGB color signal to be detected;

a second distance calculation unit (distance calculation unit B 103) for calculating a distance, as a second distance, from the coordinate of the RGB input pixel to the foot;

a hue detection unit (104) for detecting a hue of a signal of the RGB input pixel;

a third distance calculation unit (detection region generation unit 105) for generating a detection region in a color difference direction (saturation direction) according to the first distance and the hue of the signal of the RGB input pixel, and calculating a third distance based on the first distance with respect to the detection region; and a judging unit (106) for judging the RGB input pixel as being in the predetermined color detection region when the third distance is longer than the second distance as a result of a comparison between the second distance and the third distance.

In a further embodiment of the invention, the specific color detection circuit's predetermined color detection region is a region having a three-dimensional structure in which a circular bottom face of a certain size with the coordinate of the color signal to be detected as a center thereof is connected to the origin by a straight line or a combination of straight lines, and the third distance calculation unit (detection region generation unit 105) calculates the third distance by multiplication processing by use of a slant of a generatrix of the three-dimensional structure or clip processing by use of a predetermined threshold.

In yet a further embodiment of the invention, the specific color detection circuit's predetermined color detection region is any one of a region having a conical structure with the origin as a top thereof, a region having an incorporated structure of a circular cone with the origin as a top thereof and a cylinder with a bottom face having the same size as that of the circular cone, a region having an incorporated structure of a first circular cone with the origin as a top thereof and a second circular cone with a top thereof at a position opposite to that of the origin relative to a bottom face of the first circular cone, or a region having a cylindrical structure simply including the bottom face.

In a further embodiment of the invention, the specific color detection circuit's predetermined color detection region is a region having a three-dimensional structure in which a circular bottom face of a certain size with the coordinate of the color signal to be detected as a center thereof is connected to the origin by nonlinear curves, and the third distance calculation unit (detection region generation unit 105) calculates the third distance by obtaining a value corresponding to the first distance based on the curves.

In still another embodiment of the invention the specific color detection circuit's predetermined color detection region is a region having a three-dimensional structure in a bell shape defined by rotating the curves around an x axis fulfilling $y=a\cdot x^n$ (wherein x, y and a are positive numbers and n<1) on an xy plane, or a region having a three-dimensional structure in a trumpet shape defined by rotating the curves around an x axis fulfilling $y=b\cdot x^n$ (wherein x, y and b are positive numbers and n>1) on an xy plane.

In another embodiment of the invention the specific color detection circuit's predetermined color detection region is a region having a spherical structure with the coordinate of the color signal to be detected as a center thereof, the second distance calculation unit (distance calculation unit B 103) calculates a distance, as the second distance, from the RGB input pixel to the color signal to be detected, and the third distance calculation unit (detection region generation unit 105) outputs a radius of the sphere or a predetermined value as the third distance.

In yet another embodiment of the invention the specific color detection circuit's second distance calculation unit (distance calculation unit B 103) configures a look-up table having data of sample values of square roots and difference values between the sample values for calculating the second distance by use of a square root, and performs an interpolation based on the sample values of the square roots and the difference values between the sample values when a desired value is not in the look-up table for calculating the second distance.

In still another embodiment of the invention the specific color detection circuit's hue detection unit (104) detects the hue by comparing levels of the RGB input pixel, or by obtaining a ratio between the first distance and a length of the straight line connecting the origin and the coordinate of the RGB color signal to be detected or the coordinate with the same RGB ratio as that of the RGB color signal to be detected, and comparing differences between values obtained by multiplying the coordinate of the RGB color signal to be detected by the ratio and values of the coordinate of the RGB input pixel.

According to the specific color detection circuit of the present invention, it is possible to detect a specific color in the three-dimensional structure by controlling the detection region in a specific luminance direction and on a specific color difference plane. In addition, according to the specific color detection circuit of the present invention, the detection region can be controlled in each hue block by performing hue division, which enables more flexible specific color detection.

Moreover, according to the specific color detection circuit of the present invention, even when the desired value is not in the look-up table, the value can be calculated by the interpolation. It is thus possible to form the look-up table in a memory with a small capacity.

For the hue division on the color difference plane, when there is a detection plane only in a certain hue range, it was conventionally not possible to effectively utilize the other hue ranges. However, it is possible to perform the hue division on the detection plane on the specific color difference plane of the present invention. Thus, it is possible to perform more flexible color detection.

It is emphasized that the above-described embodiments of the present invention, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

DESCRIPTION OF THE PREFERRED EMBODIMENT(S)

Figure 1:
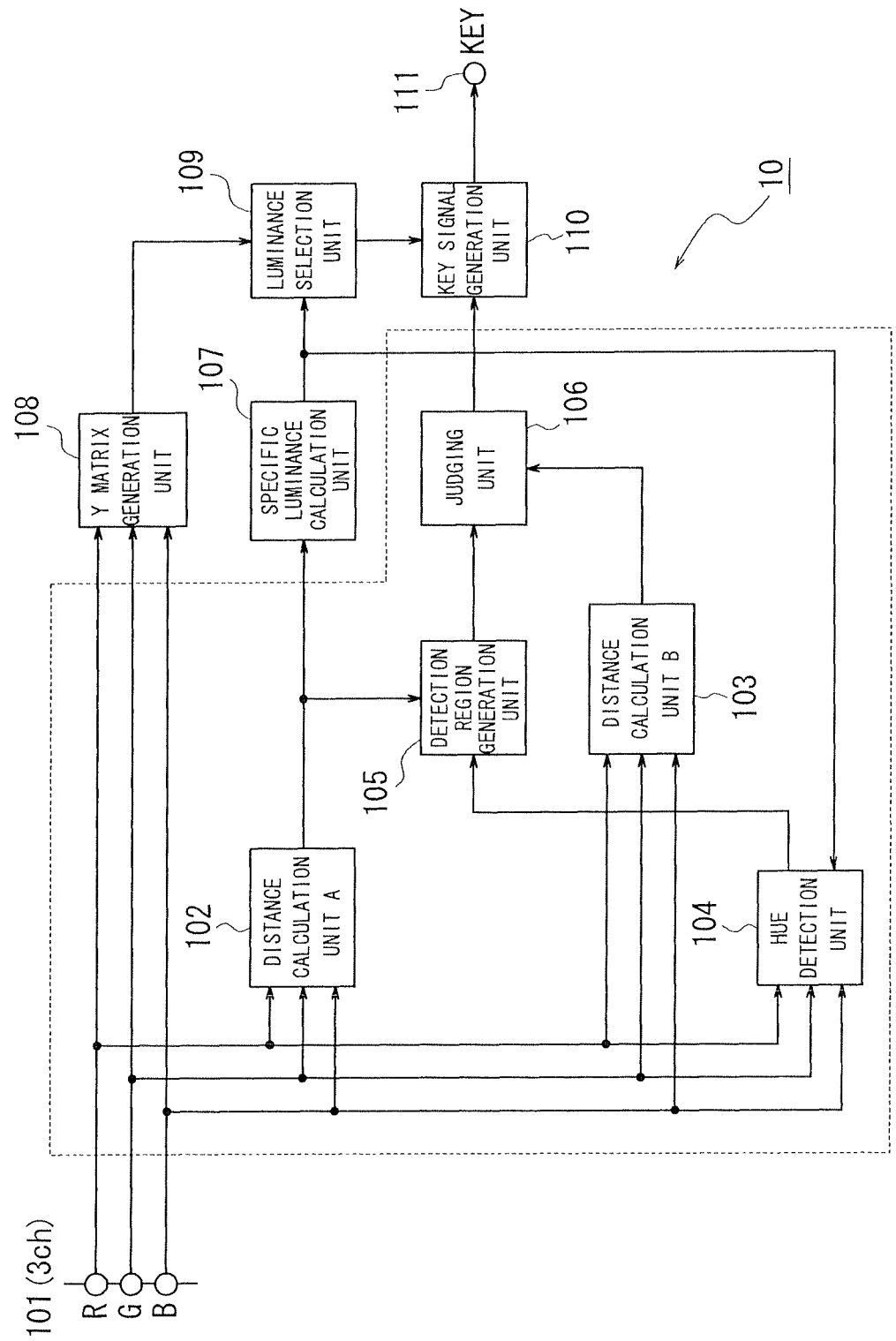
FIG. 1 is a block diagram of a KEY signal generation circuit according to the present invention.

An embodiment of the present invention is specified herebelow referring to the drawings.

First comes a description of a principle on which the present invention is based.

A color signal consists of signals of three primary colors: an R signal, a G signal and a B signal. In the present invention, signal levels of the R, G and B signals of the color signal to be detected are replaced with an RGB coordinate point (this point is referred to as point M, for example) in a three-dimensional coordinate. In addition, a straight line (OM) connecting the RGB coordinate point (point M) and an origin of the three-dimensional coordinate (an origin (O)) is defined as a center of a detection region.

In addition, in the present invention, it is judged whether an input pixel is in a region where color detection is performed. In order to judge it, an RGB signal, i.e., an input pixel, is shown in the three-dimensional coordinate (this point is referred to as point L, for example) and a perpendicular is drawn from the point (L) to the above straight line (OM) (an intersection of them is referred to as point N, for example), so as to calculate a distance (LN) from the point (L) to the straight line (OM). Moreover, a distance (ON) from a foot of the above perpendicular (intersection N) to the origin (O) is figured out so as to obtain a predetermined distance based on the distance (ON). In the present invention, the predetermined distance is compared with the distance (LN) from the input pixel (L) to the straight line (OM), and the input pixel is judged as "being in the region" when the distance from the input pixel to the straight line (LN) is shorter.

Next comes a description of a specific luminance and a specific color difference used in an embodiment of the present invention. Generally, a color is determined depending on a ratio of R:G:B. A straight line connecting the origin and a set of points where ratios of the R:G:B are the same represents a luminance axis of the present invention, and each color to be detected has a specific luminance axis. In addition, a plane orthogonal to the luminance axis represents a specific color difference plane. The luminance and the color difference are hereinafter referred to as the "specific luminance" and the "specific color difference", respectively, so as to distinguish them from generally-called luminance and color difference. In the present invention, the specific luminance is indicated by k.

Following is a description of a specific color detection circuit of the present invention.

FIG. 1 is a functional block diagram illustrating a schematic configuration of a KEY signal generation circuit in an embodiment of the specific color detection circuit of the present invention. The area surrounded by dashed line is a main section of the KEY signal generation circuit of the present embodiment.

As shown in FIG. 1, the KEY signal generation circuit 10 comprises an input terminal 101 (3ch), a distance calculation unit A 102, a distance calculation unit B 103, a hue detection unit 104, a detection region generation unit 105, and a judging unit 106. The KEY signal generation circuit 10 is further provided with a specific luminance calculation unit 107, a Y matrix generation unit 108, a luminance selection unit 109, a KEY signal generation unit 110 and a KEY signal output terminal 111.

The performance of each functional unit shown in FIG. 1 is described below.

R, G and B pixel signals are input to the input terminal 101 (3ch). The R, G and B signals from a television camera or other video apparatuses are digitally converted into a pixel value and then input to the input terminal 101 (3ch).

When the pixel of the color to be detected is shown in the three-dimensional coordinate, the distance calculation unit A 102 calculates the distance (ON) from the origin (O) to the foot of the perpendicular (intersection N) which is drawn from the input pixel (point L) to the straight line (OM) connecting the pixel to be detected (point M) and the origin (O).

The processing in which the distance calculation unit A 102 calculates the distance (ON) can be shown in the formula below. It is to be noted that the pixel is shown by a coordinate (R, G, B) in the following description.

The coordinate of the point L, which is the input pixel, is shown by (Rl, Gl, Bl), while the coordinate of the point M, which is the coordinate of the color to be detected, is shown by (Rm, Gm, Bm). When the values of the coordinate of the point M are small, multiplied values of the coordinate of the point are used since the ratios of R, G and B are the same. The foot of the perpendicular drawn from the point L to the straight line (OM) connecting the point M and the origin (O) is a point N and shown by a coordinate (Rn, Gn, Bn).

Provided that the distance from the point M to the origin (O) is OM and the distance from the point N to the origin (O) is ON, a formula (1) having the k as a positive number is satisfied:

$$ON = k*OM \qquad (1)$$

The formula (1) can be shown by elements of the coordinate as shown in the following formula (2):

$$(Rn, Gn, Bn) = k*(Rm, Gm, Bm) \qquad (2)$$

Moreover, since a plane including a segment LN connecting the points L and N is orthogonal to the straight line OM, a following formula (3) is satisfied:

$$(Rn-Rl)*Rm + (Gn-Gl)*Gm + (Bn-Bl)*Bm = 0 \qquad (3)$$

Calculation of the k based on these formulas (2) and (3) is shown as a following formula (4):

$$k = (Rm*Rl + Gm*Gl + Bm*Bl)/(Rm^2 + Gm^2 + Bm^2) \qquad (4)$$

The ON is shown as the following formula (6) by use of the k:

$$ON = k*OM \qquad (1)$$

$$= \frac{(Rm*Rl + Gm*Gl + Bm*Bl)}{(Rm^2 + Gm^2 + Bm^2)*\sqrt{(Rm^2 + Gm^2 + Bm^2)}} \qquad (5)$$

$$= \frac{(Rm*Rl + Gm*Gl + Bm*Bl)}{\sqrt{(Rm^2 + Gm^2 + Bm^2)}} \qquad (6)$$

Here, each of the following values is defined as the following formulas (7) to (9):

$$CR = Rm/\sqrt{(Rm^2 + Gm^2 + Bm^2)} \qquad (7)$$

$$CG = Gm/\sqrt{(Rm^2 + Gm^2 + Bm^2)} \qquad (8)$$

$$CB = Bm/\sqrt{(Rm^2 + Gm^2 + Bm^2)} \qquad (9)$$

By these definitions, the above formula (6) is shown as the following formula (10):

$$ON = CR*Rl + CG*Gl + CB*Bl \qquad (10)$$

Thus, by giving pre-calculated CR, CG and CB as parameters to the circuit in advance, it is possible to reduce the amount of calculation for obtaining the ON.

An output of the distance calculation unit A 102 obtained as set forth above is input to the detection region generation unit 105 and the specific luminance calculation unit 107.

On the other hand, the distance calculation unit B 103 calculates the distance LN from the point L, the input pixel to the point N, the foot of the above perpendicular. A coordinate of the point N can be shown by use of the k as k*(Rm, Gm, Bm). The distance from the point L to the point N is calculated based on the difference in the elements of the coordinates of the point N and the point L. Provided that the difference of the elements of such coordinates is represented as (Rln, Gln, Bln), a value of each element is shown as the following formulas (11) to (13):

$$Rln = k*Rm - Rl = CRR*Rl + CRG*Gl + CRB*Bl \quad (11)$$

$$Gln = k*Gm - Gl = CRG*Rl + CGG*Gl + CRB*Bl \quad (12)$$

$$Bln = k*Bm - Bl = CRB*Rl + CGB*Gl + CRB*Bl \quad (13)$$

It is to be noted that some values in the above formulas (11) to (13) are defined as the following formulas (14) to (19):

$$CRG = \{Rm*Gm/(Rm^2 + Gm^2 + Bm^2)\} \quad (14)$$

$$CGB = \{Gm*Bm/(Rm^2 + Gm^2 + Bm^2)\} \quad (15)$$

$$CRB = \{Bm*Rm/(Rm^2 + Gm^2 + Bm^2)\} \quad (16)$$

$$CRR = \{Rm*Rm/(Rm^2 + Gm^2 + Bm^2) - 1\} \quad (17)$$

$$CGG = \{Gm*Gm/(Rm^2 + Gm^2 + Bm^2) - 1\} \quad (18)$$

$$CBB = \{Bm*Bm/(Rm^2 + Gm^2 + Bm^2) - 1\} \quad (19)$$

Therefore, the LN can be obtained by the following formula (20):

$$LN = \sqrt{(Rln^2 + Gln^2 + Bln^2)} \quad (20)$$

Similarly to the case with the distance calculation unit A 102, it is possible to dramatically reduce the amount of calculation for obtaining the LN by giving pre-calculated CRG, CGB, CRB, CRR, CGG and CBB as parameters to the circuit in advance.

Next comes a description of square root processing, which is advantageous when the distance calculation unit B 103 calculates the LN. In the square root processing, fetch processing using LUT (Look-Up Table) is performed.

Figure 2:
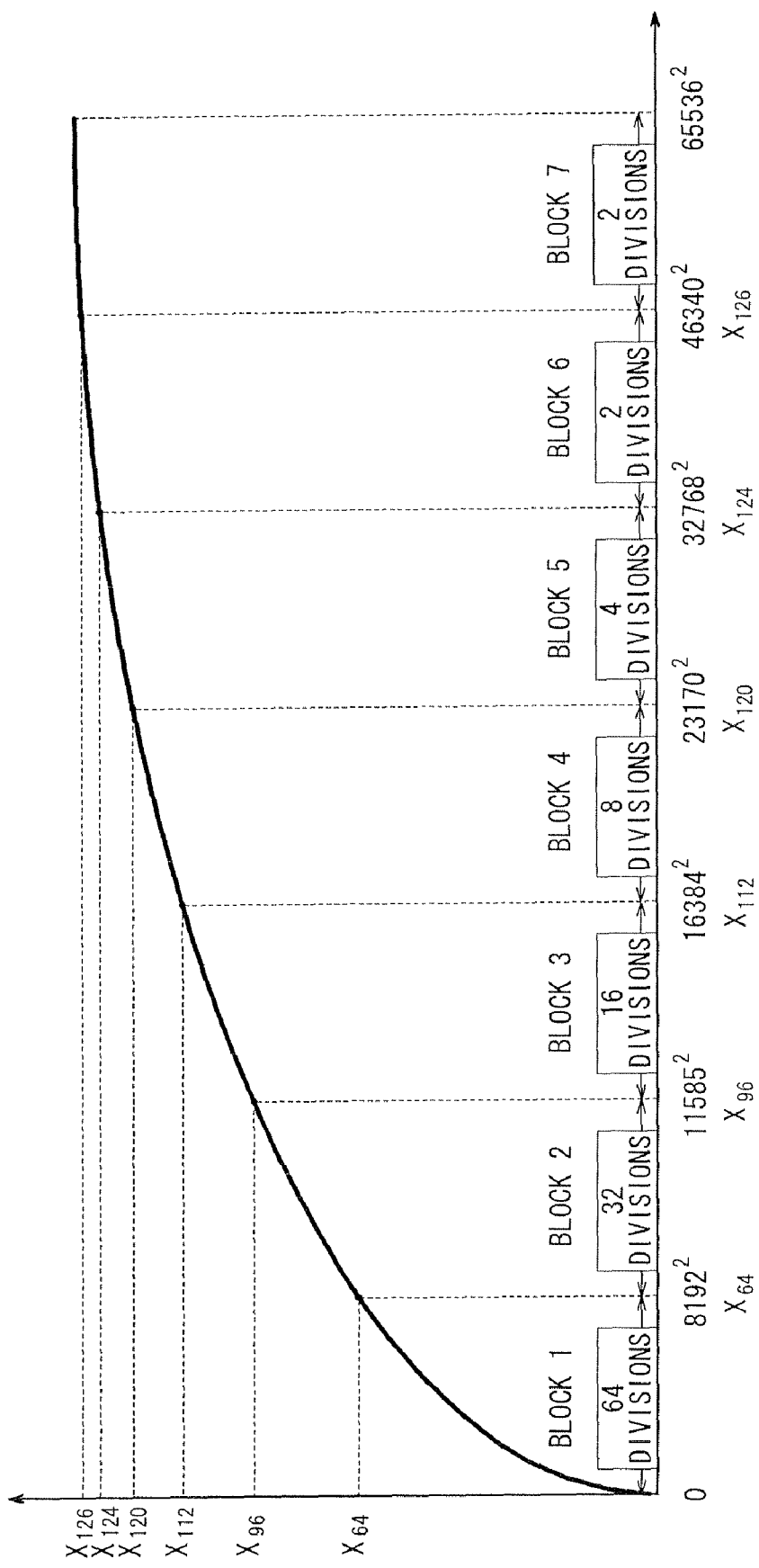
FIG. 2 is an explanatory view of calculation of a square root by a distance calculation unit B in FIG. 1.

FIG. 2 shows an example of a curve based on a square root LUT. The square root LUT stores data of actual parts of 128 samples and data of differences between the samples. The following Table 1 shows addresses, input data and the numbers of samples divided, corresponding to block numbers shown in FIG. 2.

TABLE 1

| Block Number | Address | Input data | Sample |
|---|---|---|---|
| 1 | 0-63 | 0-8191² | 64 |
| 2 | 64-95 | 8192²-11584² | 32 |
| 3 | 96-111 | 11585²-16383² | 16 |
| 4 | 112-119 | 16384²-23169² | 8 |
| 5 | 120-123 | 23170²-32767² | 4 |
| 6 | 124-125 | 32768²-46339² | 2 |
| 7 | 126-127 | 46340²-65535² | 2 |

Table 2 shows examples of sample data indicating relationships among the addresses, data of the actual parts and data of the differences between the samples.

TABLE 2

| Address | Data of Actual Part | Data of Difference Between Samples |
|---|---|---|
| 0 | 0 | 1024 |
| 1 | 1024 | 424 |
| 2 | 1448 | 326 |
| 3 | 1774 | 274 |
| 4 | 2048 | 242 |
| 5 | 2290 | 218 |
| 6 | 2508 | 201 |
| 7 | 2709 | 187 |
| 8 | 2896 | 176 |
| 9 | 3072 | 166 |
| 10 | 3238 | 158 |
| ... | ... | ... |
| ... | ... | ... |
| ... | ... | ... |
| ... | ... | ... |
| ... | ... | ... |
| ... | ... | ... |
| 117 | 20886 | 788 |
| 118 | 21674 | 761 |
| 119 | 22435 | 735 |
| 120 | 23170 | 2735 |
| 121 | 25905 | 2473 |
| 122 | 28378 | 2274 |
| 123 | 30652 | 2116 |
| 124 | 32768 | 7364 |
| 125 | 40132 | 6209 |
| 126 | 46341 | 19194 |
| 127 | 65535 | 0 |

The data of the differences between samples are used for calculation by use of a linear interpolation when a desired value is an intermediate value.

The following is a description of processing for obtaining a square root by use of a specific value, a square root of 1440000, for example. Since 1440000 is greater than 1048576, which is 1024² corresponding to the address 1, and smaller than 2096704, which is 1448² corresponding to the address 2, 1440000 is an intermediate value between the address 1 and the address 2. Here, the difference from the data of the actual part corresponding to the address 1 is obtained based on the data of the difference between samples 424 corresponding to the address 1, by use of linear interpolation as shown in the following formula (21):

$$424*(1440000 - 1048576)/1048576 = 158 \quad (21)$$

Since the data between 0 to (8192²) is divided into 64 divisions (block 1), the denominator 1048576 is obtained by the formula $8192^2/64 = 1048576$.

With the calculations set forth above, the square root of 1440000 is obtained by the formula $1024 + 158 = 1182$. It is shown that the value 1182 is very close to the true value 1200. Intermediate values can be thus obtained.

It is to be noted that the data of the actual part and the data of the difference between samples may be provided from an external processing device such as a CPU. The samples of those data are rendered not to be at regular intervals so that resolution in low level parts is improved. An output of the distance calculation unit B 103 obtained as stated above is input to the judging unit 106.

Next comes a description of hue detection by the hue detection unit 104.

First, the hue detection in a normal case is described. Normally, the hue detection unit 104 detects a position of the input pixel on the color difference plane. Here, the detection region is divided into six blocks in a hue direction.

Figure 3:
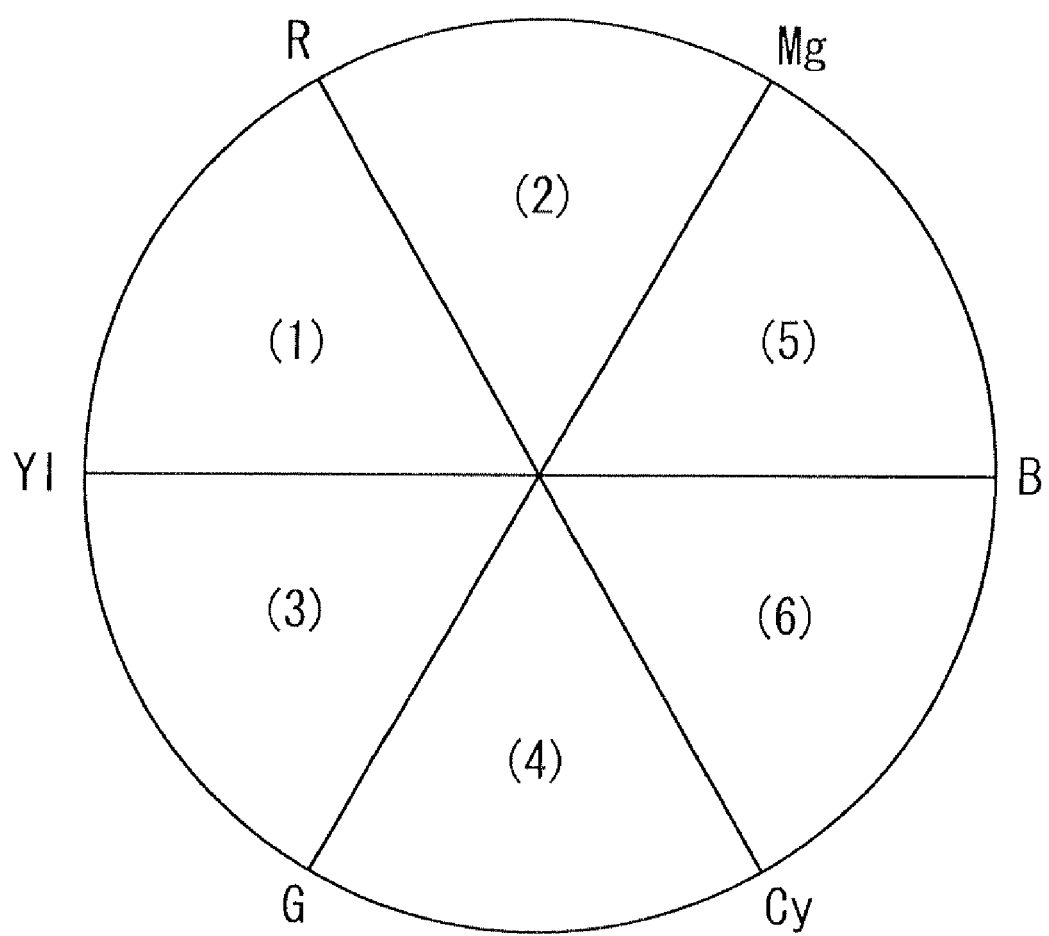
FIG. 3 is an explanatory view of hue division blocks of a hue detection unit in FIG. 1.

FIG. 3 is a diagram illustrating the detection region divided into six blocks in the hue direction by the hue detection unit 104. The position of the input pixel on the color difference plane is judged by the hue detection unit 104 based on levels of RGB of the input pixel. Patterns of the hue in the detection region divided as shown in FIG. 3 are shown in the following Table 3.

TABLE 3

| Block Number | Pattern |
| --- | --- |
| (1) | R > G > B |
| (2) | R > B > G |
| (3) | G > R > B |
| (4) | G > B > R |
| (5) | B > R > G |
| (6) | B > G > R |

Output of the result thus obtained by detection by the hue detection unit 104 is input to the detection region generation unit 105. According to the present invention, it is possible to flexibly detect a color on the color difference plane by setting a gain for each region based on the detection information by the hue detection unit 104.

Next comes a description of the hue detection in a case where the detection by dividing the blocks shown in FIG. 3 is not sufficient. In such a case, the hue detection unit 104 uses a result calculated by the specific luminance calculation unit 107 in the present invention. The specific luminance calculation unit 107 of the present invention is capable of calculating the coefficient k stated above. Calculation of the coefficient k by the specific luminance calculation unit 107 is described below.

In such a case, the hue detection unit 104 multiplies the coordinate of the color to be detected M (Rm, Gm, Bm) by the k, which is an output from the specific luminance calculation unit 107, and subtracts the result from the input color signal. That is, the hue detection unit 104 calculates each value of Rl−k*Rm, Gl−k*Gm, and Bl−k*Bm, and detects the hue by comparing the levels in Table 3 shown above based on the calculated values.

Figure 4:
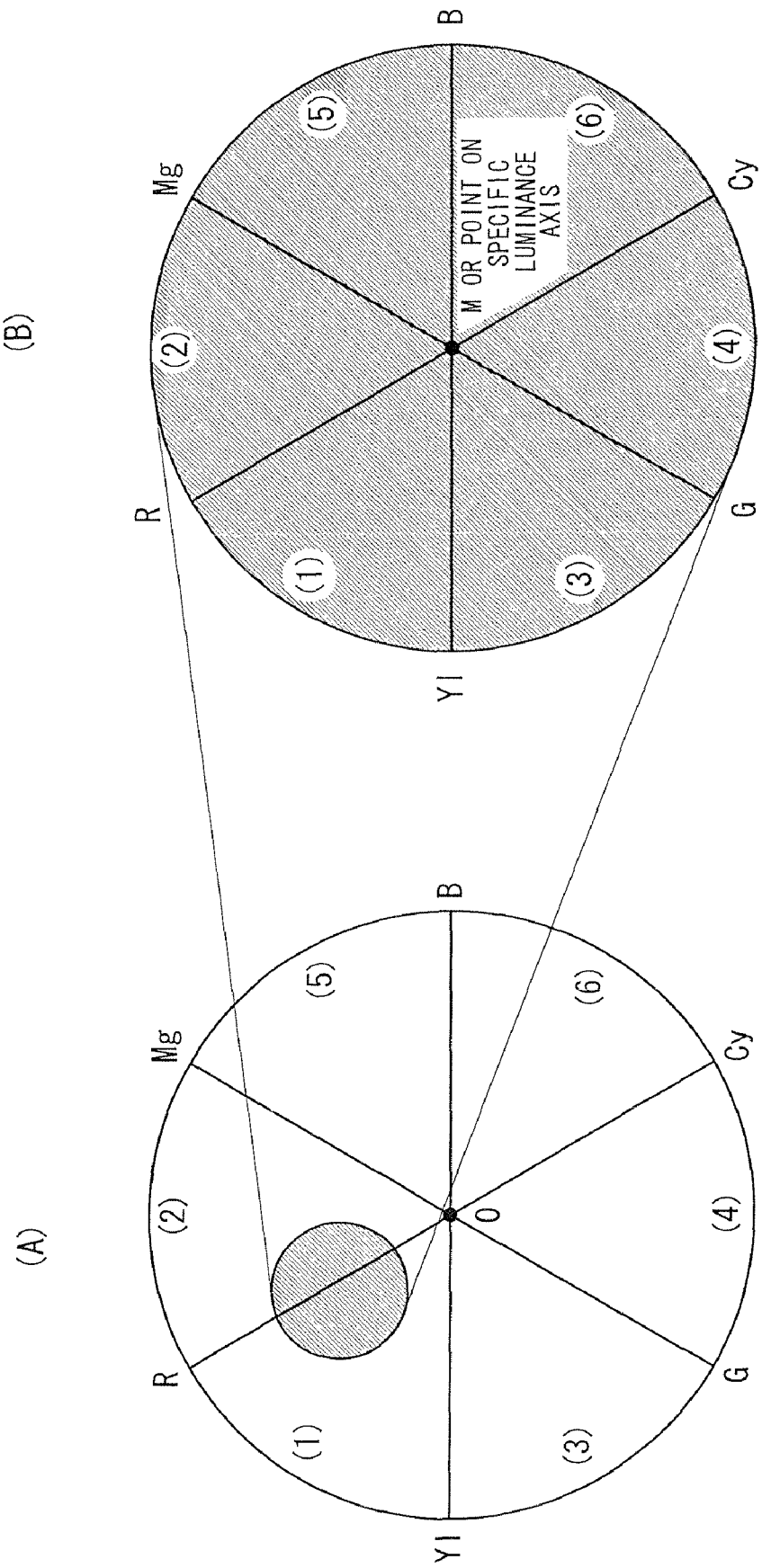
FIG. 4 is an explanatory view of a hue division in a case where color detection is insufficient.
Figure 5:
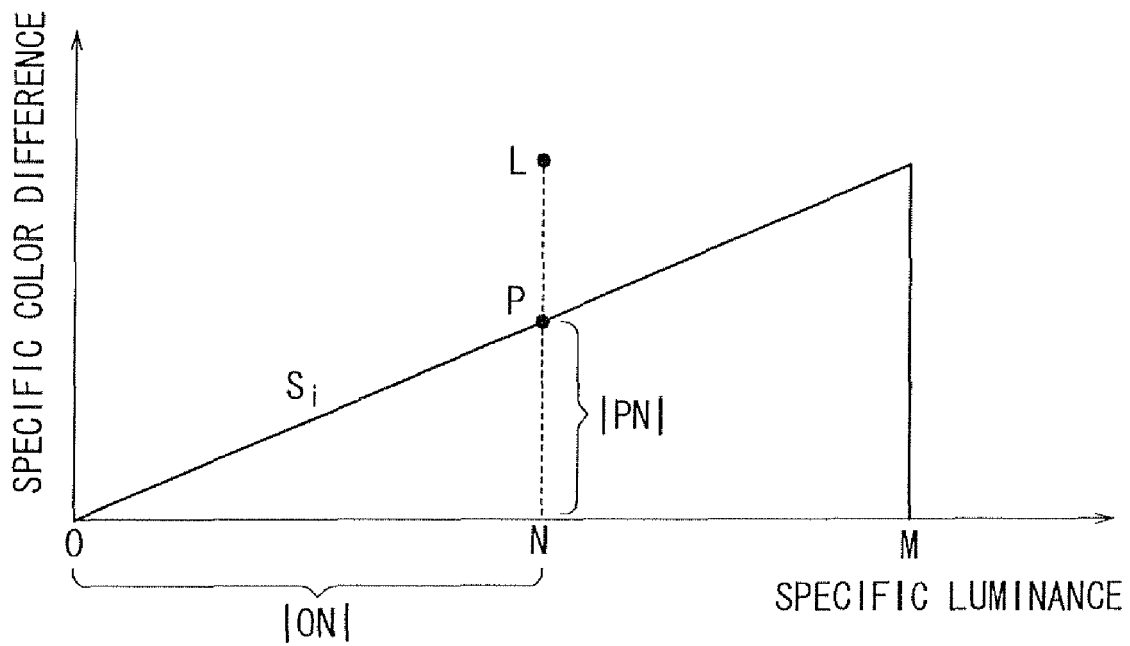
FIG. 5 is an explanatory view of a detection region in a conical shape.
Figure 5:
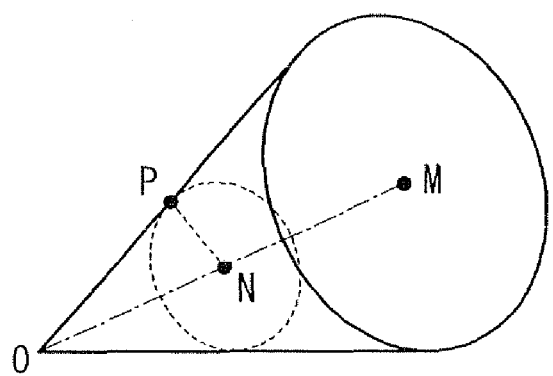

The processing in which the color signal to be detected multiplied by k is subtracted from the input color signal is equivalent to the processing in which a hue division in the color difference plane is converted into a hue division in the specific color difference plane. By this processing, the origin is shifted from the point O shown in FIG. 4A to the point M or a point on the specific luminance axis shown in FIG. 4B. Conventionally, for the hue division on the color difference plane, when a detection plane is limited to be in a certain hue range, it was not possible to effectively utilize the other hue range. On the other hand, on the specific color difference plane of the present invention, it is possible to perform the hue division on the detection plane, which enables more flexible color detection. It is suitable to adopt such processing when normal detection is not sufficient.

Next comes a description of generation of the detection region by the detection region generation unit 105.

The detection region generation unit 105 obtains a distance PN of the detection region on the specific color difference plane. Methods for obtaining the distance PN differ according to a three-dimensional structure of the detection region. Thus, the following descriptions are the methods for obtaining the distance PN for each three-dimensional structure of the detection region.

Each of FIGS. 5 and 7 to 12 is a diagram showing the plane view of the detection region with the specific luminance of OM or ON as an X axis and the specific color difference as a Y axis for each three-dimensional structure of the detection region, together with each image thereof.

FIG. 5B is an image view of the detection region in a conical shape. In this case, the PN is calculated by the following formula (22):

$$PN = Si * ON (i=1 \text{ to } 6, \text{ and } 0 \leq Si \leq 1.0) \quad (22)$$

Figure 6:
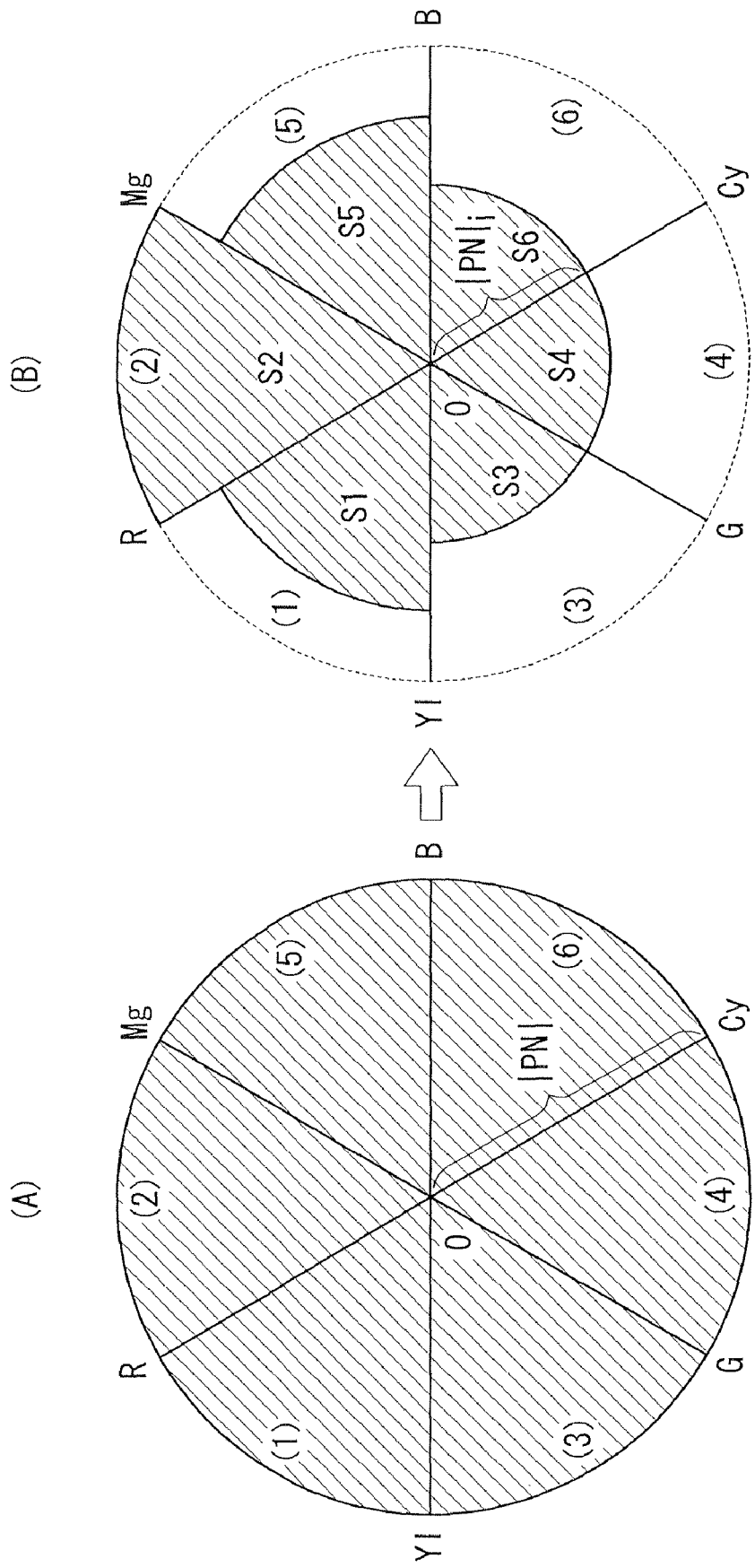
FIG. 6 is an explanatory view of a hue control by a detection region generation unit.

Here, the ON is the output from the distance calculation unit A 102. The Si may be a slant of a generatrix of a circular cone, or may be set for each block based on the output from the hue detection unit 104 as shown in FIG. 6. FIG. 6 is a diagram explaining control of the hue by the detection region generation unit 105. The i is a block number shown in FIG. 3 and takes the value from 1 to 6.

FIG. 5A is a graph showing a relationship between the input pixel and the detection region. In FIG. 5A, the segment LN is a distance from the input pixel to the foot of the perpendicular drawn to the specific luminance. The segment PN is the detection region and can be obtained by the formula (22) stated above.

Such setting of the detection region leads to an advantageous effect that flexible color detection can be performed on the specific color difference plane, as set forth above. Moreover, it becomes possible to control a circular bottom face of the detection region in a color saturation direction for each hue in a certain range, which enables flexible detection of a specific color having a complex distribution on a chromaticity.

FIG. 7B is an image view of the detection region in a pencil shape. In this case, the PN is calculated by the following formulas (23) and (24):

$$PN = Si * ON (PN \leq Yi) \quad (23)$$

$$PN = Yi (PN > Yi) \quad (24)$$

($i$=1 to 6, and $0 \leq Si \leq 1.0$)

The ON and the Si are obtained in the same way as the case for the detection region in the conical shape. The Yi is a threshold value not to make the PN greater than a predetermined multiple. For example, when a product of the ON and the Si is calculated and the product value obtained is greater than the Yi, clip processing is performed at Yi and the PN is made equal to the Yi.

FIG. 7A is a graph showing the relationship between the input pixel and the detection region. In FIG. 7A, the segment LN is a distance from the input pixel to the foot of the perpendicular drawn to the specific luminance. The segment PN is the detection region and can be obtained by the formulas (23) and (24) stated above. In this case, the PN becomes neither equal to nor greater than the Yi.

FIG. 8B is an image view of the detection region in a bicone shape. In this case, the PN is calculated by the following formulas (25) and (26):

$$PN = Si * ON (ON \leq Xi) \quad (25)$$

$$PN = Ti * ON (ON > Xi) \quad (26)$$

($i$=1 to 6, $0 \leq Si \leq 1.0$)

The ON and the Si are obtained in the same way as the case for the detection region in the conical shape. Like the Si, the Ti is a slant of a generatrix, and may also be set for each hue. The Xi is a threshold value of the specific luminance for changeover of the slant.

FIG. 8A is a graph showing the relationship between the input pixel and the detection region. In FIG. 8A, the segment LN is a distance from the input pixel to the foot of the perpendicular drawn to the specific luminance. The segment PN is the detection region and can be obtained by the formulas (25) and (26) stated above. Shown in FIG. 8A is a case where the input pixel is smaller than the Xi, i.e., a changeover threshold.

FIG. 9B is an image view of the detection region in a cylindrical shape. In this case, the PN is calculated by the following formulas (27) and (28):

$$PN=0 (ON \leq Xi \text{ and } PN \leq Yi) \tag{27}$$

$$PN=Yi (ON>Xi \text{ and } PN>Yi) \tag{28}$$

($i$=1 to 6, and $0 \leq Si \leq 1.0$)

Here, when the ON is equal to or greater than the Xi, clip processing is performed to the value of the PN and the PN is made equal to the Yi.

Figure 7:
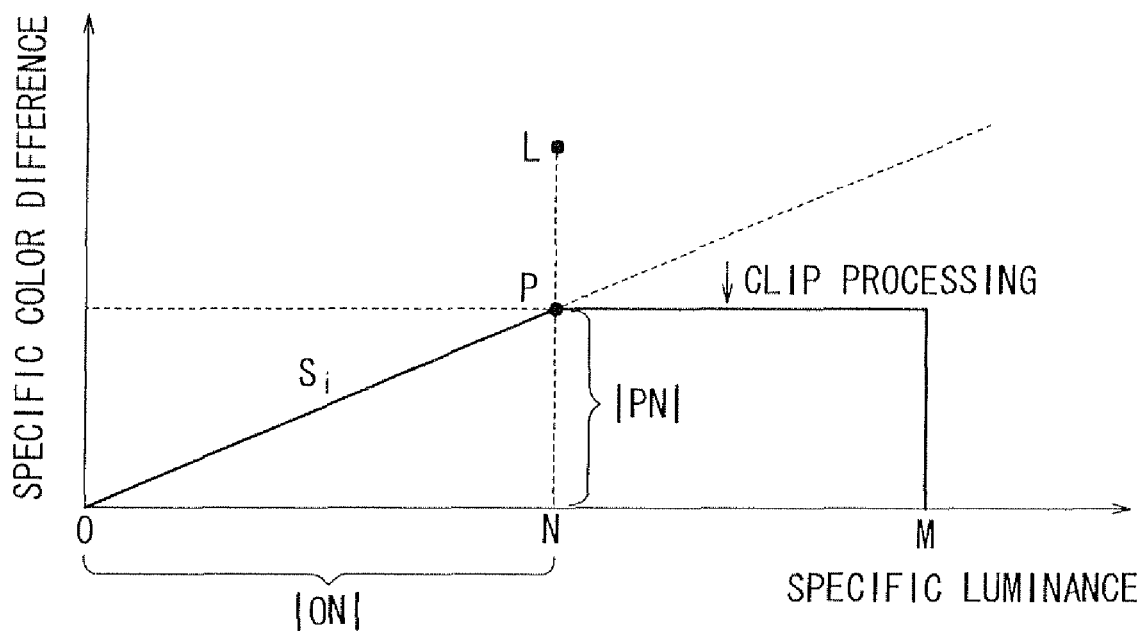
FIG. 7 is an explanatory view of a detection region in a pencil shape.
Figure 7:
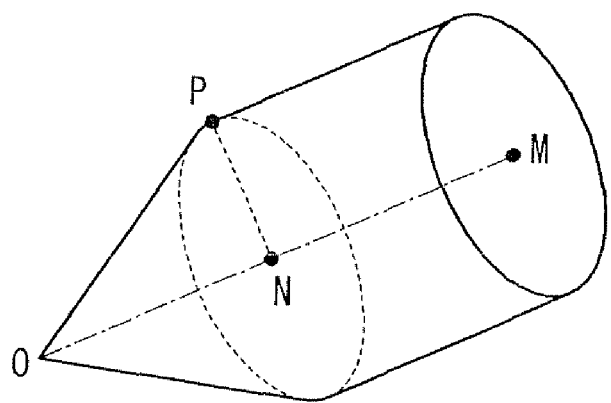
Figure 8:
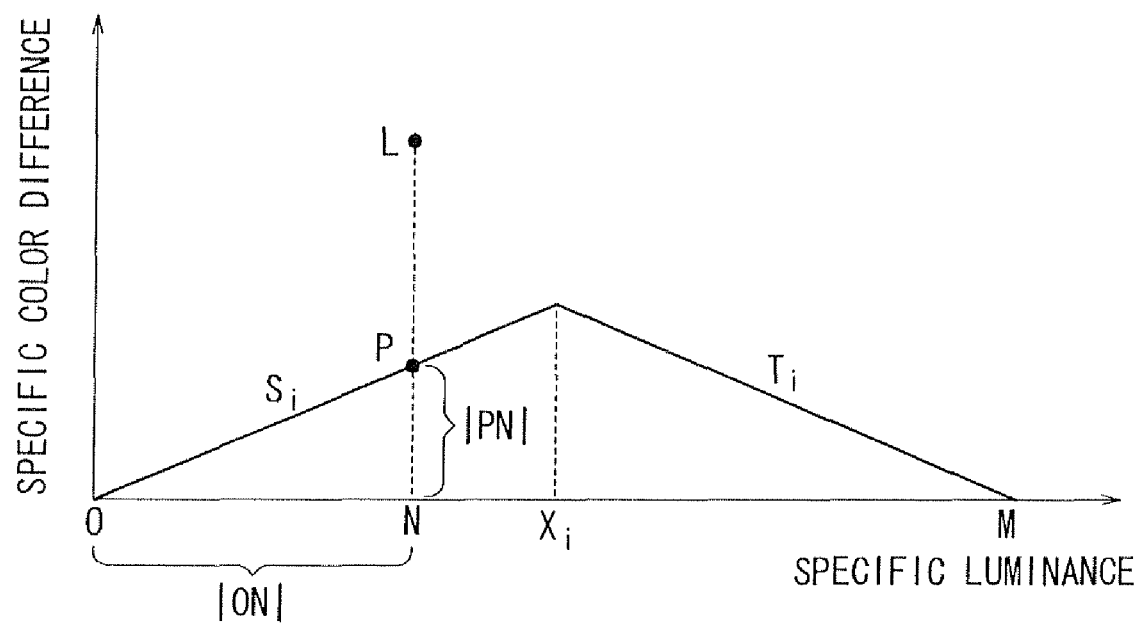
FIG. 8 is an explanatory view of a detection region in a bicone shape.
Figure 8:
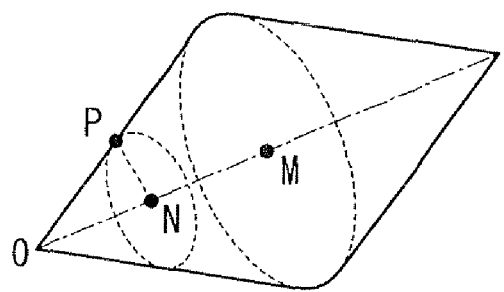
Figure 9:
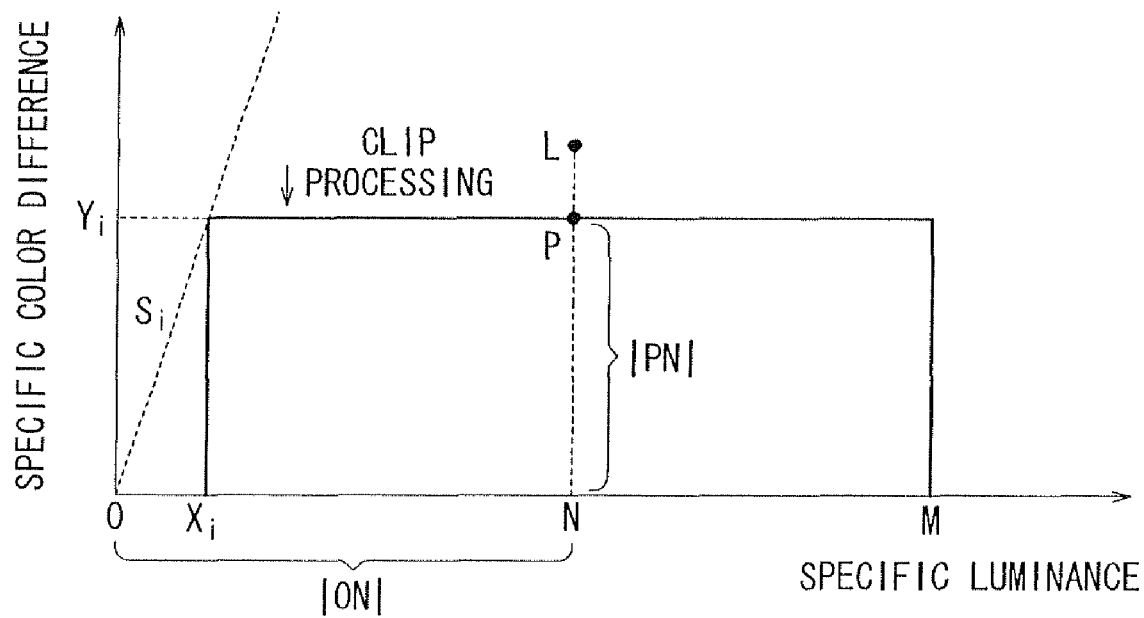
FIG. 9 is an explanatory view of a detection region in a cylindrical shape.
Figure 9:
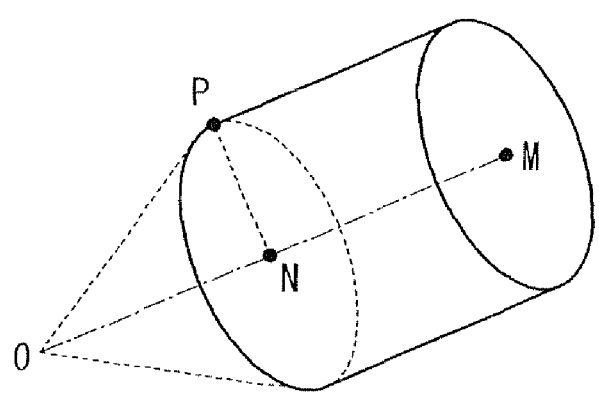
Figure 10:
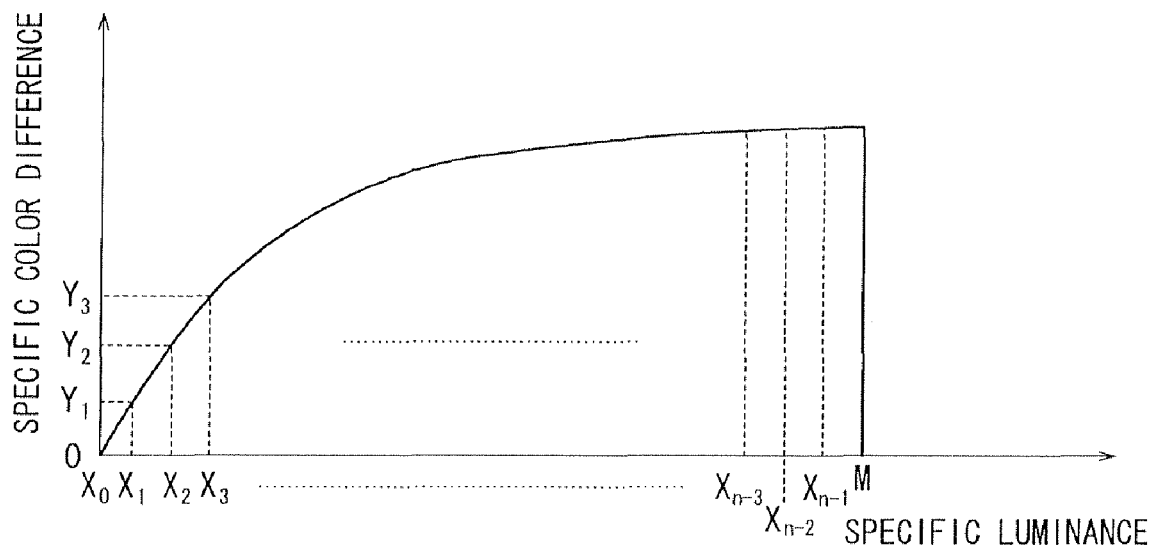
FIG. 10 is an explanatory view of a detection region in a bell shape.
Figure 10:
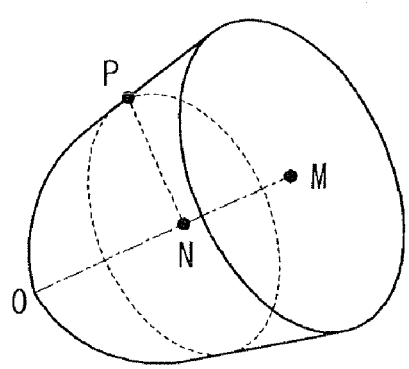
Figure 11:
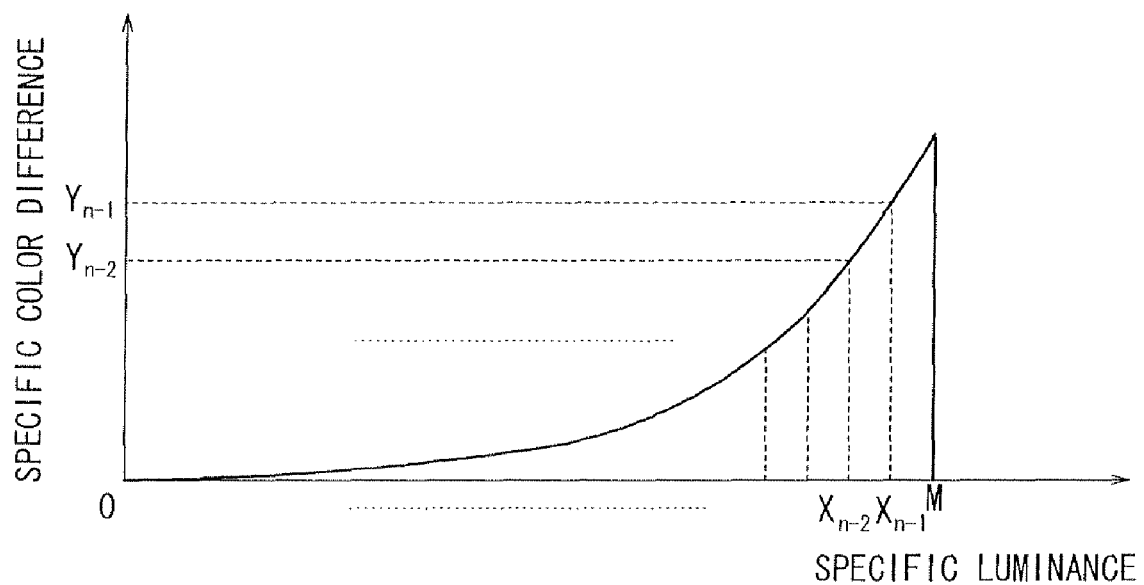
FIG. 11 is an explanatory view of a detection region in a trumpet shape.
Figure 11:
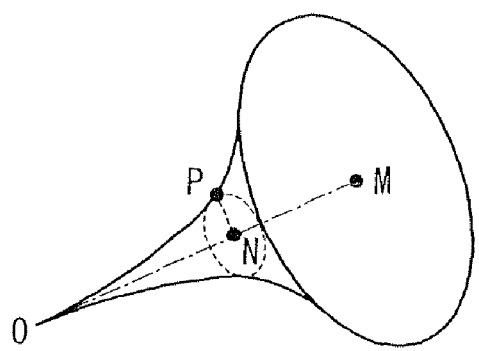
Figure 12:
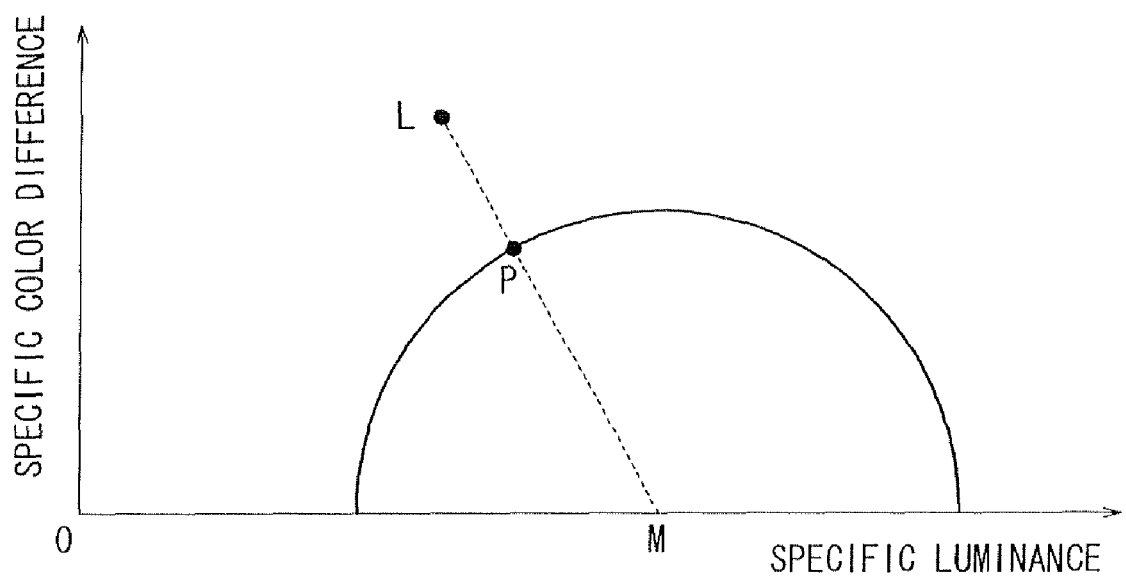
FIG. 12 is an explanatory view of a detection region in a spherical shape.
Figure 12:
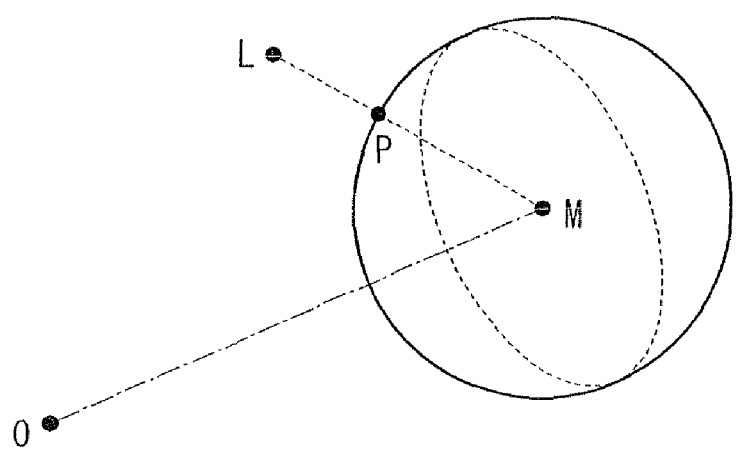

FIG. 9A is a graph showing the relationship between the input pixel and the detection region. In FIG. 9A, the segment LN is a distance from the input pixel to the foot of the perpendicular drawn to the specific luminance. The segment PN is the detection region and can be obtained by the formulas (27) and (28) stated above. In FIG. 9A, the value of the PN is obtained by performing the clip processing in the same way as the case where the detection region is in a pencil shape as shown in FIG. 7.

FIG. 10B and FIG. 11B show an image view of the detection region in a bell shape or an image view of the detection region in a trumpet shape, respectively. In those cases, the value of the Yi when the ON is the Xi is output as the PN. A correspondence relationship between the Xi and the Yi is formed based on a look-up table in which Yi is output when Xi is input.

FIG. 10A and FIG. 11A are graphs showing the relationship between the input pixel and the detection region. In each of FIG. 10A and FIG. 11A, the Xi is a distance from the origin to the foot of the perpendicular drawn from the input pixel to the specific luminance. In each of FIG. 10A and FIG. 11A, the detection region Yi is obtained according to the Xi. As set forth above, the Xi and the Yi are generated based on the look-up table.

FIG. 12B is an image view of the detection region in a spherical shape. In such a case, since the coordinate of the M is (Rm, Gm, Bm) and the coordinate of the L is (Rl, Gl, Bl), differences of those elements are obtained by the following formulas (29) to (31):

$$Rlm=Rm-Rl \tag{29}$$

$$Glm=Gm-Gl \tag{30}$$

$$Blm=Bm-Bl \tag{31}$$

Therefore, the distance LM is obtained by the following formula (32):

$$LM=\sqrt{(Rlm^2+Glm^2+Blm^2)} \tag{32}$$

Here, provided that a parameter value such as a register value is given as the PM to the circuit, and that the region fulfilling the following formula (33) is the detection region, it is possible to detect the color region in the detection region in a spherical shape having the point M as the center thereof, as shown in FIG. 12A.

$$PM \geq LM \tag{33}$$

In this case, the LM is calculated by the distance calculation unit B 103, while the PM is calculated by the detection region generation unit 105. Thereby, the detection region in a spherical shape is generated according to the formula (32) stated above.

The method to obtain the PN (or the PM) is described above for each three-dimensional structure of the detection region, and which structure is to be adopted depends on the type of the input video signal.

The detection region generation unit 105 outputs the PN or the PM obtained as set forth above, as an input to the judging unit 106. Although the constitution of the detection region generation unit 105 is set forth above, a specific constitution thereof varies according to the type of the detection region to select.

The judging unit 106 judges whether the input pixel is in a predetermined region by comparing the LN or the LM output by the distance calculation unit B 103 with the PN or the PM output by the detection region generation unit 105. When the LN is smaller than the PN or when the LM is smaller than the PM, the judging unit 106 judges that the input pixel is in the predetermined region.

When the judging unit 106 judges that the input pixel is in the predetermined region, it outputs a High signal, as a KEY signal in a color-difference direction, to the KEY signal generation unit 110. On the other hand, when the judging unit 106 judges that the input pixel is out of the predetermined region, it outputs a Low signal, as the KEY signal in the color-difference direction, to the KEY signal generation unit 110.

The specific luminance calculation unit 107 calculates a specific luminance k of the present invention. The k is calculated by the following formula (34):

$$ON=k*OM \tag{34}$$

A value of the ON is obtained from the distance calculation unit A 102. The OM is calculated by the following formula (35):

$$OM=\sqrt{(Rm^2+Gm^2+Bm^2)} \tag{35}$$

An inverse of the value of OM obtained here is rendered to be ck, and the ON is multiplied by the ck, so that the k can be calculated.

Figure 13:
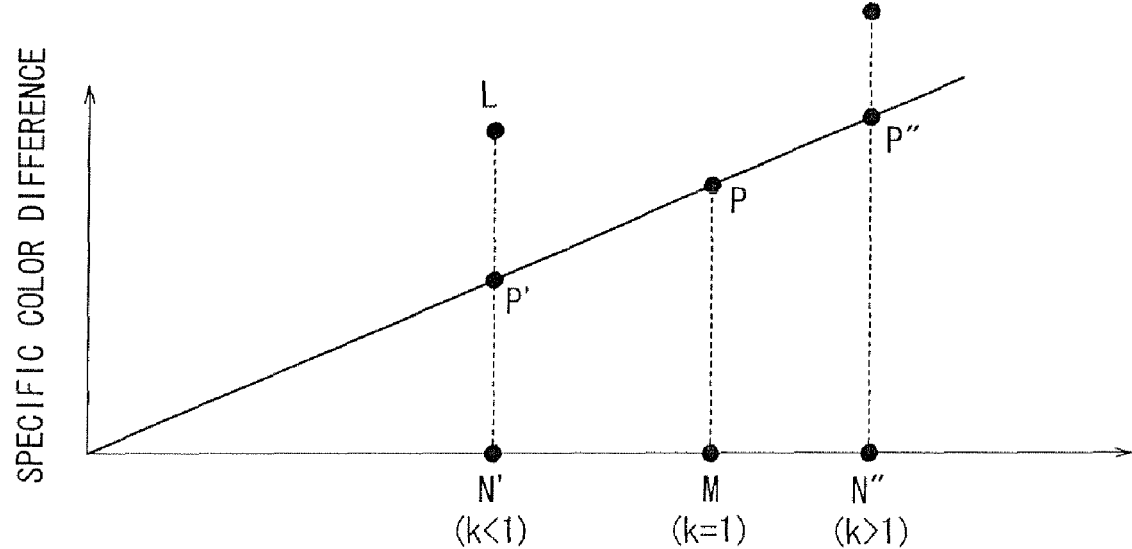
FIG. 13 is a diagram showing a positional relationship between M and N according to the variation of the value k.

The k, which is the specific luminance of the present invention, can be thus calculated from ON*ck. It is possible to dramatically reduce the amount of calculation in the circuit by preliminarily calculating the coefficient ck. The specific luminance calculation unit 107 outputs the specific luminance k thus obtained, and the output is provided to the luminance selection unit 109. For calculation of the specific luminance k, since the k is a positive number, it may take a number greater than 1. That is, the processing set forth above may deal with a value greater than the input color signal level of the point M to be detected. It is to be noted that FIG. 13 is a diagram showing a positional relationship between the M and the N according to the variation of the value k.

In conformity with the standard by NTSC (National Television System Committee), a Y matrix generation unit 108 generates the luminance signal from the input pixel according to the ratio shown in the following formula (36):

$$Y=0.30R+0.59G+0.11B \tag{36}$$

For example, in order to apply the present invention to a high-definition video, the luminance signal is generated according to a ratio for the high-definition video. The Y matrix generation unit 108 outputs the luminance signal thus obtained, and the output is provided to the luminance selection unit 109.

The luminance selection unit 109 selects outputs from the Y matrix generation unit 108 and the specific luminance calculation unit 107 by selection control (not shown), and generates the luminance signal. The luminance selection unit 109 outputs the luminance signal thus obtained, and the output is provided to the KEY signal generation unit 110.

The KEY signal generation unit 110 generates the KEY signal by mixing the outputs by the luminance selection unit 109 and the judging unit 106, or providing them as they are.

The KEY signal generation unit 110 outputs the KEY signal thus generated, as the output of the KEY signal generation circuit 10, from the output terminal 111.

Figure 14:
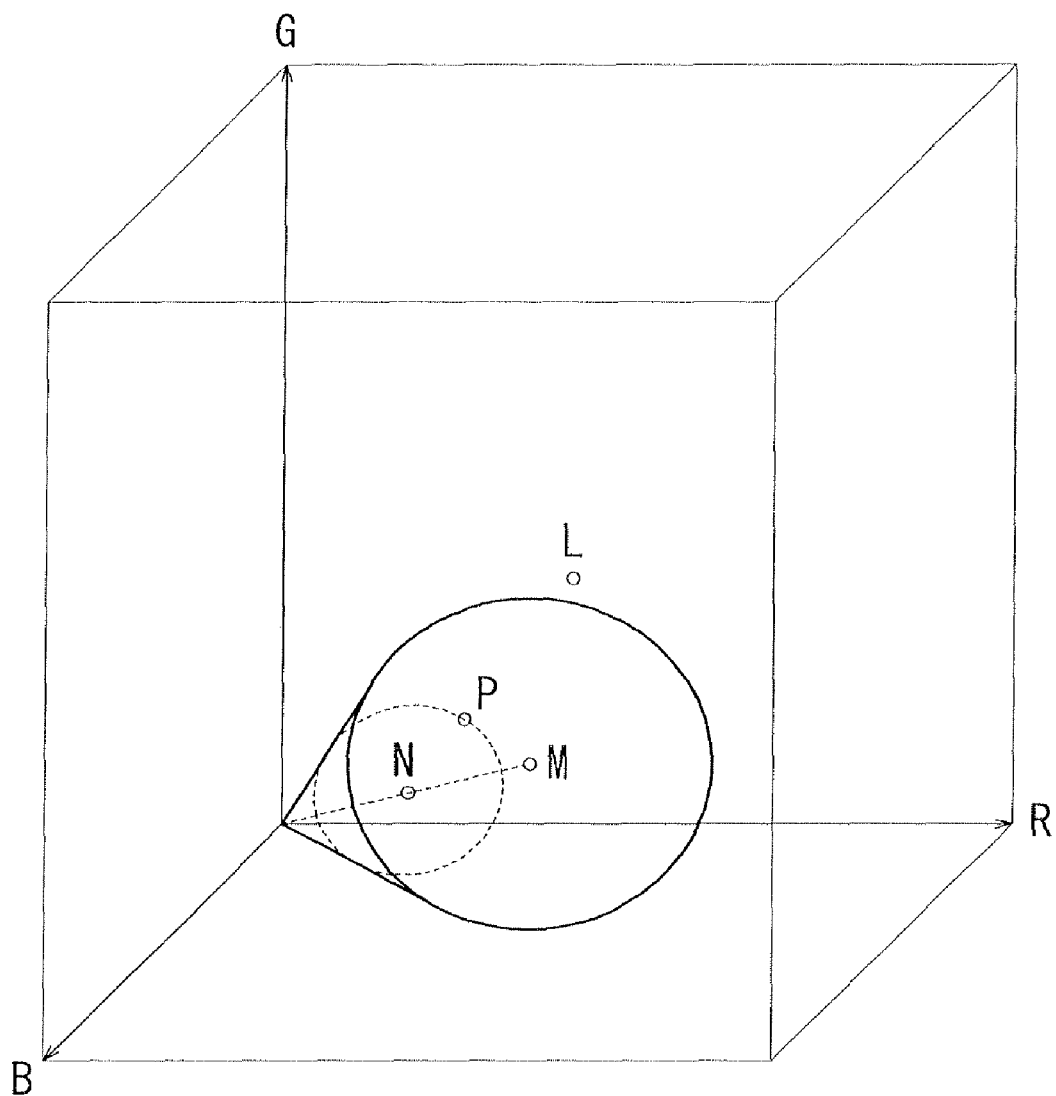
FIG. 14 is a three-dimensional diagram of a color detection range.

FIG. 14 is a three-dimensional diagram showing an example of a range of the color detection KEY signal generated by the processing set forth above.

It is to be noted that the output of the luminance selection unit 109 is the color detection KEY signal in the luminance direction, whereas the output of the judging unit 106 is the color detection KEY signal in the color-difference direction. For both of those color detection KEY signals in the luminance direction and in the color-difference direction, a slant of the KEY signal may be changed at a transition of a color. Furthermore, it is possible to separately change an alteration of KEY signals at a part of a low luminance level and at a part of a high luminance level, respectively. Examples of the patterns of the KEY signals are shown in the following Table 4.

TABLE 4

| Pattern | Color Detection KEY Signal in Color-Difference Direction or Color Detection KEY Signal in Luminance Direction or Color Detection KEY Signal in Detection Region |
|---|---|
| 0 | KEY Signal x1/16 |
| 1 | KEY Signal x1/8 |
| 2 | KEY Signal x1/4 |
| 3 | KEY Signal x1/2 |
| 4 | KEY Signal x1 |
| 5 | KEY Signal x2 |
| 6 | KEY Signal x4 |
| 7 | KEY Signal x8 |
| 8 | KEY Signal x16 |
| 9 | KEY Signal x32 |
| 10 | KEY Signal x64 |
| 11 | KEY Signal x128 |
| 12 | KEY Signal x256 |
| 13 | KEY Signal x512 |
| 14 | KEY Signal x1024 |
| 15 | KEY Signal x2048 |

In order to detect a specific color in a color space, it is necessary to mix two KEY signals shown above. Such mixing is performed according to the following formula (37), for example:

$$KEY = \text{luminance KEY} * \text{color difference KEY} \quad (37)$$

The KEY signal thus obtained is the color detection KEY signal in the detection region shown in Table 4.

Similarly to the above case, for this KEY signal also, a slant of the KEY signal may be changed at the transition of a color. Those KEY signals stated above may be output independently.

Examples of signal selections of the color detection KEY signals are shown in the following Table 5.

TABLE 5

| KEY Selection | Color Detection KEY Signal |
|---|---|
| 0 | KEY Signal |
| 1 | Color Difference KEY Signal |
| 2 | Luminance KEY Signal |

Which key is used differs depending on the usage of the image signal or the video signal.

Although the embodiment of the present invention is described as set forth above, the present invention is not limited to the above embodiment but a number of variations and alterations thereof are also possible. For example, although the embodiment set forth above has a constitution using the LUT so as to reduce the amount of time for calculation, it is also possible to have a constitution to perform each calculation by use of a processor with a high processing speed.

In addition, although the RGB input pixel is directly input in the above embodiment, it is also possible to have a constitution to provide the RGB input pixel after performing offset or gain adjustment thereto.

It is assumed that such offset or gain adjustment is needed in the following case. For example, it is supposed that there are video images having the same background scenery but one of them has a tinge of blue because it is taken during the day, while another has a tinge of red because it is taken in the evening. In such a case, detection of a color sometimes cannot be performed accurately because the colors in the video images, which are originally the same color, have different tinges in the above conditions.

In order to solve such a problem, it is possible to perform the gain adjustment so as to set the luminance axis for reflecting a color temperature of the day or a color temperature of the evening. Such gain adjustment enables detection of the same object with the same result regardless of the circumstances.

Moreover, the offset set forth above can be effectively used in a case where the RGB input pixel is blackened and cannot be detected as its original color.

Although in the above embodiment each processing is performed by use of the RGB signal as the input pixel, it is also possible to convert the color signal, which was provided as an RGB signal, into one of a different color system, such as an XYZ color system for example, and then perform the color detection in the subsequent stage.

The present invention is useful for a video processing device to perform a special effect by the color detection. In particular, the present invention is suitable for detecting the skin-color by the television camera to control the outline enhancement signal, or for detecting a particular color and a color range to perform color correction processing for correcting a color or changing the color into a desired one.

What is claimed is:

1. A specific color detection circuit for judging whether an RGB input pixel is a signal in a predetermined color detection region having a color signal to be detected as a center thereof, comprising:

a first distance calculation unit for showing an RGB input pixel and an RGB color signal to be detected in a three-dimensional coordinate with three axes of R axis, G axis and B axis, and calculating a distance, as a first distance, from an origin to a foot of a perpendicular drawn from the coordinate of the RGB input pixel to a straight line connecting the origin and the coordinate of the RGB color signal to be detected or a coordinate with the same RGB ratio as that of the RGB color signal to be detected;

a second distance calculation unit for calculating a distance, as a second distance, from the coordinate of the RGB input pixel to the foot;

a hue detection unit for detecting a hue of a signal of the RGB input pixel;

a third distance calculation unit for generating a detection region in a color difference direction according to the first distance and the hue of the signal of the RGB input pixel, and calculating a third distance based on the first distance with respect to the detection region; and a judging unit for judging the RGB input pixel as being in the predetermined color detection region when the third distance is longer than the second distance as a result of a comparison between the second distance and the third distance.

2. The specific color detection circuit according to claim 1, wherein the predetermined color detection region is a region having a three-dimensional structure in which a circular bottom face of a certain size with the coordinate of the color signal to be detected as a center thereof is connected to the origin by a straight line or a combination of straight lines; and the third distance calculation unit calculates the third distance by multiplication processing by use of a slant of a generatrix of the three-dimensional structure or clip processing by use of a predetermined threshold.

3. The specific color detection circuit according to claim 2, wherein the predetermined color detection region is any one of a region having a conical structure with the origin as a top thereof, a region having an incorporated structure of a circular cone with the origin as a top thereof and a cylinder with a bottom face having the same size as that of the circular cone, a region having an incorporated structure of a first circular cone with the origin as a top thereof and a second circular cone with a top thereof at a position opposite to that of the origin relative to a bottom face of the first circular cone, or a region having a cylindrical structure simply including the bottom face.

4. The specific color detection circuit according to claim 1, wherein the predetermined color detection region is a region having a three-dimensional structure in which a circular bottom face of a certain size with the coordinate of the color signal to be detected as a center thereof is connected to the origin by nonlinear curves, and the third distance calculation unit calculates the third distance by obtaining a value corresponding to the first distance based on the curves.

5. The specific color detection circuit according to claim 4, wherein the predetermined color detection region is a region having a three-dimensional structure in a bell shape defined by rotating the curves around an x axis fulfilling $y=a \cdot x^n$ (wherein x, y and a are positive numbers and $n<1$) on an xy plane, or a region having a three-dimensional structure in a trumpet shape defined by rotating the curves around an x axis fulfilling $y=b \cdot x^n$ (wherein x, y and b are positive numbers and $n>1$) on an xy plane.

6. The specific color detection circuit according to claim 1, wherein the predetermined color detection region is a region having a spherical structure with the coordinate of the color signal to be detected as a center thereof, the second distance calculation unit calculates a distance, as the second distance, from the RGB input pixel to the color signal to be detected, and the third distance calculation unit outputs a radius of the sphere or a predetermined value as the third distance.

7. The specific color detection circuit according to claim 1, wherein the second distance calculation unit configures a look-up table having data of sample values of square roots and difference values between the sample values for calculating the second distance by use of a square root, and performs an interpolation based on the sample values of the square roots and the difference values between the sample values when a desired value is not in the look-up table for calculating the second distance.

8. The specific color detection circuit according to claim 1, wherein the hue detection unit detects the hue by comparing levels of the RGB input pixel, or by obtaining a ratio between the first distance and a length of the straight line connecting the origin and the coordinate of the RGB color signal to be detected or the coordinate with the same RGB ratio as that of the RGB color signal to be detected, and comparing differences between values obtained by multiplying the coordinate of the RGB color signal to be detected by the ratio and values of the coordinate of the RGB input pixel.

* * * * *